Nov. 4, 1952  G. E. BRANDT  2,616,938
ELECTRODE FOR GALVANIC CELLS
Filed June 2, 1950  5 Sheets-Sheet 1

INVENTOR:
GUSTAF ERIK BRANDT
BY
Richardson, David and Nordon
ATTY'S

Nov. 4, 1952 — G. E. BRANDT — 2,616,938
ELECTRODE FOR GALVANIC CELLS
Filed June 2, 1950 — 5 Sheets-Sheet 2

INVENTOR:
GUSTAF ERIK BRANDT
BY Richardson, David and Nordon
ATTYS

Nov. 4, 1952  G. E. BRANDT  2,616,938
ELECTRODE FOR GALVANIC CELLS

Filed June 2, 1950  5 Sheets-Sheet 3

INVENTOR
GUSTAF ERIK BRANDT
By
Richardson, David and Nordon
Att'ys

Nov. 4, 1952  G. E. BRANDT  2,616,938
ELECTRODE FOR GALVANIC CELLS
Filed June 2, 1950  5 Sheets-Sheet 5

INVENTOR:
GUSTAF ERIK BRANDT
BY
Richardson, David and Nordon
ATTYS

Patented Nov. 4, 1952

2,616,938

UNITED STATES PATENT OFFICE 2,616,938

ELECTRODE FOR GALVANIC CELLS

Gustaf Erik Brandt, Nol, Sweden, assignor to Aktiebolaget Tudor, Stockholm, Sweden, a Swedish joint-stock company Application June 2, 1950, Serial No. 165,799
In Sweden March 4, 1949

23 Claims. (Cl. 136—64)

The present invention relates to such electrodes for galvanic cells as comprise a framework comprising conductive parts being embedded in and carrying the active material and conductive bars wholly or in part uncovered by active material and connected to the firstmentioned conductive parts. The purpose of these bars is to give the electrode the necessary mechanical stiffness and strength and to serve as bus bars ensuring the necessary low resistance for the charging and discharging currents in different parts of the electrode. Well known electrodes of this type are so-called mass-plates in lead-acid accumulators.

It is the object of the invention to provide an electrode having a very great strength and a long lifetime and imparting to the cell in which it is included great reliability and low operating costs.

The invention also relates to a method of manufacturing such cells.

The invention is especially useful when applied to storage batteries for mobile service which are exposed to concussions and vibrations and often operate under very unfavourable conditions.

The electrode according to the invention is foremost characterized by the fact that the abovementioned bars are provided at least on the parts uncovered by active material with a coating of insulating electrolyte-resistant material, and further that a liquid passing sheet firm insulating and electrolyte-resistant material is secured on either side of the electrode to the insulating coating of the said bars, and that a layer of porous or fibrous insulating and electrolyte-resistant material is inserted on either side of the electrode between the active material and the said liquid passing sheet.

In a preferred embodiment of the invention the said coating of insulating electrolyte-resistant material has such an extension on either side of the said bars that those boundary lines of the said coating which are located adjacent to the active material are underneath the surface of the active material.

Further characteristics of the invention will appear from the following description of the embodiments shown on the accompanying drawings.

Figure 1:
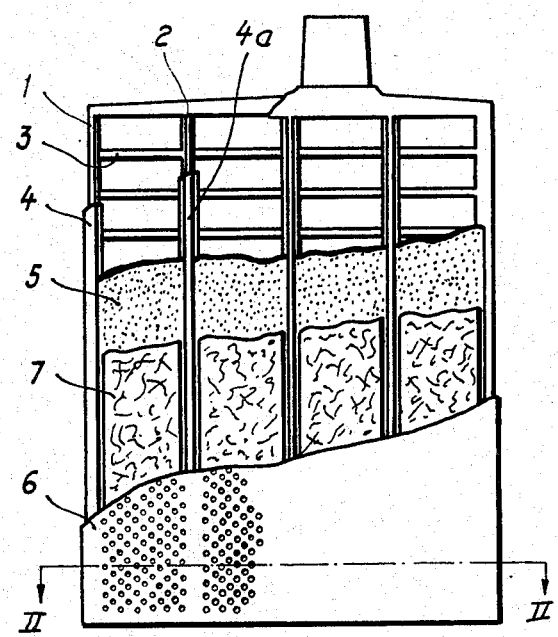
Figure 1 is a side view of a so-called grid plate according to the invention partly cut in different planes.

In the arrangement according to Figure 1 the framework of the plate consists of a frame 1, heavy conductive bars 2 which in the following will be referred to as main bars, and thin bars 3, in the following referred to as intermediate bars, which are arranged perpendicularly to the main bars. The intermediate bars are wholly embedded in active material, designated 5 on the drawing, and serve to hold the active material in its position and also to reduce the effect of the electric resistance of the active material and provide a large effective contact surface between the active material and the framework of the plate. The main bars 2 and the frame 1 which are connected to these intermediate bars thus form bus bars and impart simultaneously the necessary mechanical stiffness and strength to the plate. Such an arrangement is known per se and is common in so called grid plates.

If the accumulator in which the plate is included is exposed to rough treatment and especially if the active material has been more or less mellowed by repeated charges and discharges, the active material tends to fall out so that the capacity of the plate becomes decreased and there will be a risk of short circuiting between the plates of the cell.

In order to prevent this the plate according to the invention is dressed with a layer 7 positioned adjacent to the active material and consisting of an insulating material which is capable of absorbing a large amount of electrolyte and makes a relatively slight obstruction for the electrolyte feed to the plate but nevertheless is capable of keeping the active material and preventing it from falling out. This insulating material must therefore be porous or fibrous and it preferably consists of glass wool, polyvinyl chloride or any other suitable electrolyte-resistant insulating material being permeable by liquids, for instance in the form of fibres or threads compressed to a cloth or mat. This layer which has a relatively slight strength in itself, is held by an outer liquid passing foil 6 of insulating electrolyte-resistant material. It is important that this outer cover does not cause any considerable resistance to the electrolyte circulation, and whether the cover is porous in itself or is provided with perforations as in the embodiment shown in the figure, it is necessary to ensure the most efficient electrolyte circulation under preservation of the required mechanical strength of the cover. Preferably the cover consists of polyvinyl chloride, so called decelite, or some other thermoplastic material which for purposes which will be stated below shows a softening temperature lower than that of the lead. This foil is preferably thin and flexible but of a tensile strength which is great enough to make it possible to give it a certain tension when applied to the plate so that it will exert a certain pressure against the underlying layer 7 and the active material 5. Of course it is important that the cover does not soften or creep at the operating temperature of the accumulator so that a deformation of the cover occurs after some time of operation.

The use of a flexible foil for the outer cover does not only involve that the material consumption becomes small and the manufacture simplified but also, as mentioned above, that a distributed and properly adjusted pressure can easily be attained by causing the cover to pull around the plate, whether this is brought about by compressing the insulating layer 7 on the manufacture of the plate and thus under the influence of the elastic properties of this layer, or by keeping the outer cover stretched during the application by pulling the same. Preferably the outer cover is an integral foil being folded about the plate during the manufacture.

It will be understood that the width of the cover walls thus formed which is determined by the width of the plate, will be so large that any considerable pressure cannot be maintained against the central portions of the plate, and without special arrangements there would still be the risk of the active material falling out.

It is an important circumstance that in the plate according to the invention it is desired that a disintegration of the active material occurring during operation, even if going so far as to turn the active material wholly or partly into a fine powder, shall not result in the plate becoming useless due to reduction of capacity or increase of the internal resistance. In order that the plate shall maintain under such circumstances its properties, it is required that a satisfactory contact pressure is maintained between the different particles of the material thus disintegrated or pulverized.

According to the invention this problem has been solved thus that the main bars 2 comprised in the framework are utilized for fastening the foil 6 so that the foil forms a plurality of narrow pockets thus ensuring that a fairly uniform pressure of desired magnitude is maintained all over the surface of the plate. However, the foil is not fastened directly to the main bars which would be very difficult if at all practicable, but in a manner which will be described below.

In order that the plate shall get a long life it is also required that the parts of the framework of the plate which are uncovered by active material, that is the frame 1 and the main bars 2, are prevented from taking part in the electrochemical processes and being affected by the electrolyte. They may also cause a local activity impairing the efficiency of the plate. For this reason these parts are provided with coatings 4, 4a and 4b of an electrolyte-resistant insulating material which is not permeable by liquids.

According to the invention the cover 6 is attached to these coatings whereby the difficulties of effecting a secure fixation of the cover are wholly eliminated. The fastening can be carried out by some cementing method, but it is especially convenient that the cover 6 as well as the coatings 4, 4a and 4b consist of thermoplastic material such as polyvinyl chloride, so-called decelite, or the like having a softening temperature which is less than that of the lead, whereby the parts can be simply joined by a welding process or a combined welding and cementing process.

However, it is also a problem to effect a simple and effective attachment of the insulating coatings 4a and 4b to the main bars. Certainly it would be possible to glue or cement these coatings to the main bars, but such a procedure is troublesome and insecure in point of durability. Therefore the coatings are made in two halves in the shape of strips or channel-shaped pieces, 4a and 4b. Each of these halves covers half the surface of the respective main bar and the halves are pressed under heat against each other, whereby the intermediate bars 3 penetrate into the edges of the said halves and the edges abutting against each other are welded or cemented together.

Figure 2:
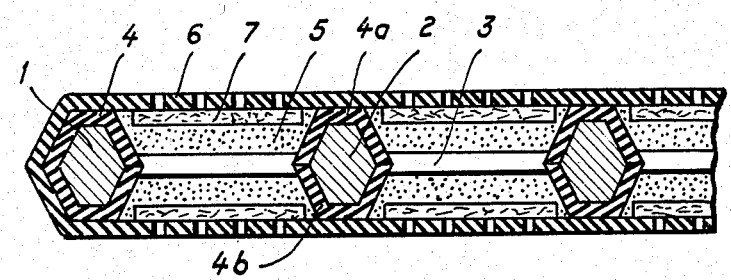
Figure 2 is a cross section of the plate taken along line II—II in Figure 1.

This embodiment is clearly illustrated in Figure 2 which is a section on an enlarged scale taken along the line II—II in Figure 1 in the plane of the upper surface of the intermediate bars 3.

It will be seen from Figures 1 and 2 that the short sides of the grid meshes will be covered with insulating material. Principally it is an important feature of preferred embodiments of the invention that the insulating coating of the main bars (and in some case that of the frame also) extends underneath the surface of the active material, whereby the risk is avoided that any portions of the lead parts in question are exposed to the electrolyte at the joint between the edge of the insulating coating and the surface of the active material. The coating of the frame 1 can be performed in a similar manner as appears at 4 in Figure 2. In order that the above-mentioned advantage shall be obtained, it is necessary that the insulating coatings 4, 4a and 4b respectively are applied before the framework of the plate is filled with active material.

Of course it is also possible to provide the edges of the insulating strips or channel-formed pieces before their application with recesses into which the intermediate bars 3 fit, and then perform the welding or cementing. It is also possible to provide only one edge of each strip or channel-shaped piece with recesses, and the strips or channel-formed pieces may conveniently be made in the form of a continuous band which is cut into proper lengths. If a non-thermoplastic material is used, or if no heating process is applied, it is of course quite necessary to provide the halves in advance with such recesses.

Figure 3:
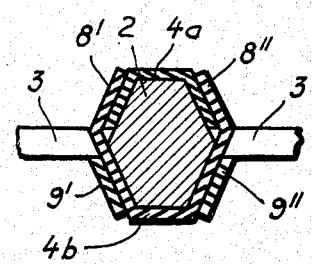
Figure 3 shows a feasible insulating coating of the conductive bars by means of insulating strips.

In the use of relatively thin thermoplastic or other material for the said coatings it may be advantageous not to make the edges of the halves abut against each other but instead overlap each other. In Figure 3 an example of such an arrangement is shown in section. The two halves 4a and 4b of the coating applied to a main bar are formed with projections 9' and 9'' and 8' and 8'' respectively, the projections extending alternately through pairs of grid meshes positioned underneath each other and abutting against the outer surface of the opposite half of the insulating coating.

Figure 4:
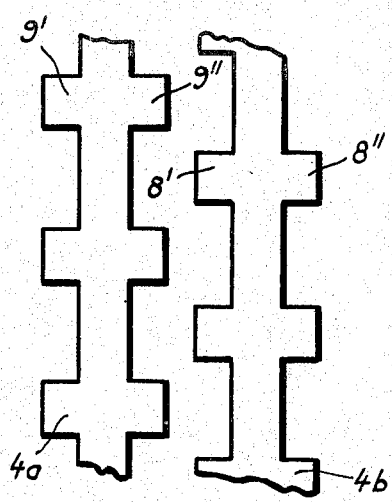
Figure 4 shows the shape of the strips used in the arrangement according to Figure 3.

Fig. 4 shows these halves schematically as spread out and their relative position in vertical direction.

These strips can be made in the form of continuous bands which are cut in convenient lengths. The cut strips may be exactly alike, the desired displacement between the levels of the projections being simply brought about by turning one of the strips 180° in its own plane.

Figure 5:
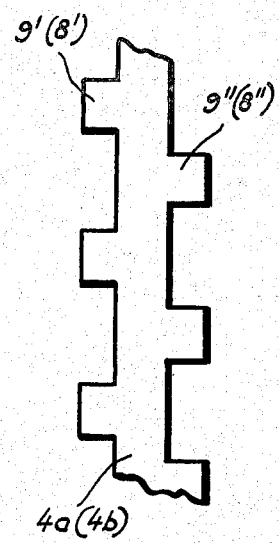
Figure 5 shows a modified shape of the strips used for the insulating coating.

In Fig. 5 a strip is shown having the projections arranged in zigzag. Also in this case identical strips may be made for both sides of the main bars, but in this case the desired displacement between the levels of the projections is brought about by turning one strip 180° about its longitudinal axis.

Of course the method of joining the strips or channel-shaped pieces can be further modified, although not illustrated on the drawings. Thus for instance each strip or channel-shaped piece may be provided with projections on one side only, one projection being preferably provided for each grid mesh in a vertical row of grid meshes and the projections of each strip or channel-shaped piece passing through grid meshes positioned at either side of the main bar concerned and being welded or cemented to the outer surface of the opposite strip or channel-shaped piece.

In all the arrangements described above for joining the insulating strips or channel-shaped pieces 4a and 4b provided on either side of a grid bar the number of projections or connecting parts may, if desired, be small in relation to the number of grid meshes in a vertical row and/or the width of the projections may be considerably less than the height of the grid meshes, for instance when it is desired to obtain contact between the active material and the main bars. As mentioned above it is however advantageous to make the insulating strips or channel-shaped pieces so wide that their edges are located somewhat underneath the surface of the active material.

As regards the insulating coating 4 on the frame parts 1 this may consist of strips or channel-shaped pieces embracing the edge of the plate and the edges of which may be joined through the grid meshes in a manner similar to any of those suggested for the fastening of the strips or channel-shaped pieces 4a and 4b. By using a relatively thick thermoplastic material and forming under heating the part 4 around the part 1, the former can be firmly fixed even though any joint through the grid meshes is not provided. Also in this case the edges of the insulating coating should be located under the surface of the active material.

In the arrangement shown in Figure 1 the perforations in the foil 6 have the shape of circular holes, and the portions of the foil which contact underlying insulating coatings are not perforated.

Figure 6:
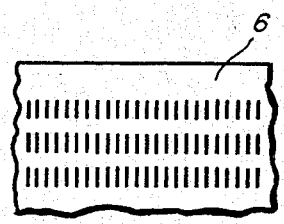
Figure 6 shows a portion of an embodiment of the outer insulating foil in which the foil is carried out in a certain manner with perforations in the form of slots.

Of course the perforations may have some other shape, and may be for instance in the form of slots as shown in Figure 6. The slots in this case are vertical and arranged in horizontal rows, separated by unperforated fields. The latter may be useful in point of strength since they increase the resistivity of the foil against deforation by tensile strain for instance when the foil is pulled tightly around the plate.

Whether such horizontal unperforated fields are present or not and irrespective of the shape of the perforations it may be an advantage that perforations are present in the portions contacting the underlying insulating coatings, since the perforations at these places may to some degree facilitate the welding or cementing.

A plate dressed as shown in Figure 1 shows a considerable mechanical rigidity and strength.

Figure 7:
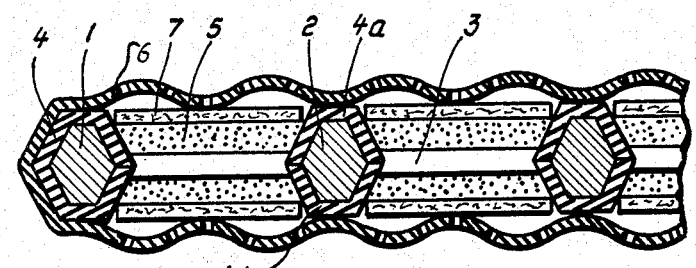
Figure 7 shows in section a modification of the arrangement in Figures 1 and 2 in which the outer insulating foil is corrugated on either side of the plate, the furrows formed by the corrugations containing substantially only electrolyte.

In Figure 7 a plate is shown in section in which the foil 10 is corrugated and in which a very good strength of the plate can also be obtained. Certain of the ridges formed by the corrugations and facing the framework will then abut against and be joined to the underlying insulating coatings, while the others press against the porous or fibrous insulating material 7 and hold it in its position. The furrows formed by the corrugations and facing the framework permit a relatively free circulation of the electrolyte which is of importance for the operation of the plate.

Figure 8:
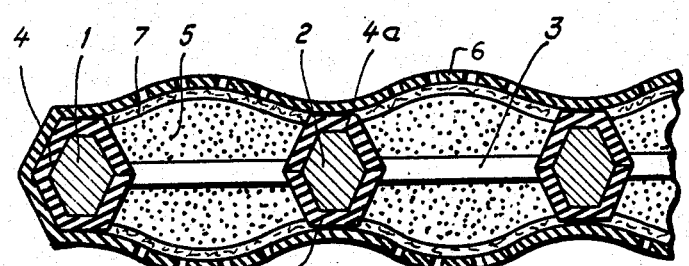
Figure 8 shows an arrangement differing from the arrangement according to Figure 7 only in that the furrows formed by the corrugations are utilized to receive active material.
Figure 9:
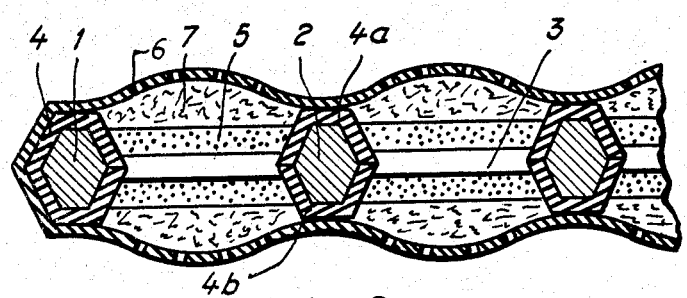
Figure 9 shows a further modification of the arrangement according to Figure 7 in which the furrows formed by the corrugations are wholly filled with fibrous insulating material.

The corrugations may also be made so that each of the said furrows bridges the space between two adjacent main bars 2 as shown in Figures 8 and 9.

The furrows formed by the corrugation may be filled as shown in Figure 8 with active material, a relatively thin layer 7 of porous or fibrous material being maintained outermost whereby an increased capacity of the plate can be obtained, or these furrows may also be wholly filled with such insulating material as shown in Figure 9.

Of course the invention may be applied to plates having widely different arrangements of the main bars, and also for instance to plates having main bars transversing each other.

Figure 10:
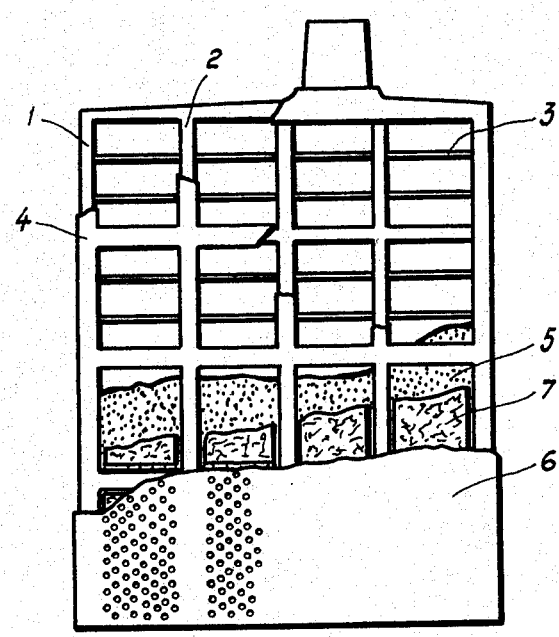
Figure 10 shows in side view an accumulator plate according to the invention having horizontal as well as vertical conductive bars.

Such a plate is shown in Figure 10. The vertical as well as the horizontal bars are provided with insulating coatings to which the foil 6 is attached, and thus a number of substantially square pockets is formed.

Figure 11:
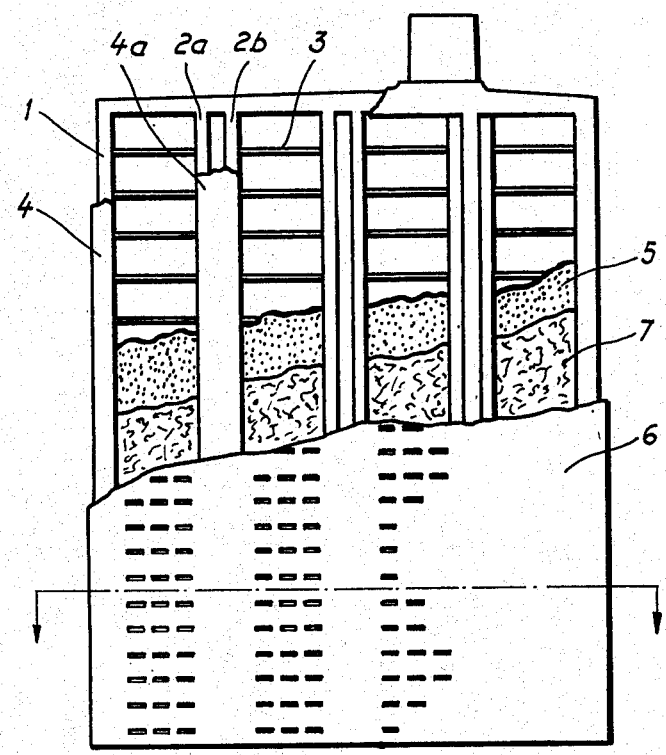
Figure 11 shows in side view an accumulator plate having vertical conductive bars arranged in pairs.
Figure 12:
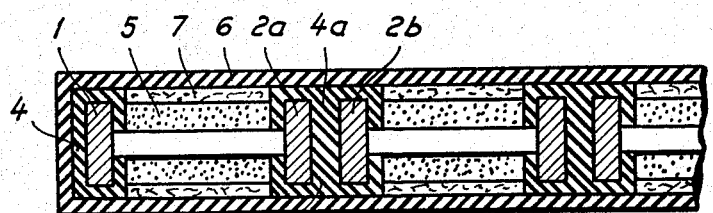
Figure 12 shows the plate according to Figure 11 in cross section.

In Figures 11 and 12 a further embodiment of the invention is shown. The main bars are here provided with longitudinal slots dividing the main bars into two parallel bars 2a and 2b. These slots are passed through by strips 4a—4b which may consist as in the preceding embodiments of two joined halves but preferably are integral strips of thermoplastic material which are formed when applied so that they spread over the side surfaces of the bars 2a and 2b and get a cross section in the shape of a double T as shown in the figure. The edges of the strip thus flattened out facing the grid meshes extend underneath the surface of the active material, and such edges opposing each other may eventually be joined in some of the ways proposed in connection with the previously described embodiments.

Although the slot as shown in Figures 11 and 12 extends over the whole length of the plate only a number of apertures arranged in a row need to be provided, through which apertures the two halves are connected to each other, the maximum spacing between the apertures being determined by the stiffness of the portions of the insulating material located on the outer surfaces of bars 2a and 2b.

When thermoplastic material is used the fastening of the insulating coatings can also be effected by providing non-piercing recesses, grooves or ridges on the main bars and/or the frame portions, the insulating material on application being caused by heating to fill up these recesses or grooves or to embrace the ridges. The said recesses, grooves or ridges should then comprise portions forming a "negative" angle with the normal of the plane of the plate so that a deformation of the insulating material will be necessary to remove the insulating coatings which implies that the coatings will be firmly held in their position.

The coatings may also be carried out by moulding thermoplastic material directly around the main bars and the frame portions.

An electrode according to the invention can for instance be manufactured in the following manner.

By some method which is of no importance per se for the invention, a lead framework is made having for instance the shape shown in Figure 1. Strips or channel-shaped pieces of insulating thermoplastic material are applied to the frame portions 1 and the main bars 2 according to any one of the methods described above. Then the framework is filled with active material (in the concept "active material" also such material is included as is to be made active in a subsequent forming process) so that the outer sides of the insulating coatings 4 and 4a, 4b respectively will be substantially flush with the surface of the active material or project to some extent above this surface. The porous or fibrous insulating layer 7 is then applied which can be made in many different ways. This layer may preferably consist of glass wool or the like compressed to a cloth or mat, and such cloth can be cut on beforehand into strips fitted to the sections of the plate formed by the main bars, the strips being lightly cemented or pasted to the surface of the active material. However it is more convenient to cover the whole side surfaces of the electrode with such cloth, either by using one piece of cloth for each side surface or by using one continuous sheet of cloth for both the side surfaces which is folded about one edge of the electrode. Also in this case the cloth may be preliminarily fixed by a light pasting and the portions of it which are located over the insulating coatings, are then scraped off. A perforated foil of thermoplastic material, for instance polyvinyl chloride, the width of which is about equal to the height of the plate and the length of which is somewhat larger than the circumference of the plate is folded in a special tool or simply about the edge of a heated plate, a bar or the like. The folded foil is pushed over the plate from its one long side, and then the plate is placed between two plane heated pressure plates, whereby the cover 6 is welded to the insulating coatings 4 and 4a, 4b respectively. The edges of the cover at the other long side of the plate are folded over each other and welded together so that an overlapping joint is obtained. The insulating coatings and/or the portions of the cover abutting against the same may be smeared before the welding with a dissolving medium for the thermoplastic material whereby the welding is facilitated.

In the case when the whole electrode surfaces are covered with a cloth or mat of porous or fibrous insulating material it is not quite necessary to scrape off this material over the insulating coatings. Instead a concentrated pressure may be applied to these portions so that the mat at the welding is compressed at these places to thin layers which become impregnated with melted thermoplastic material and after the cooling will form a rigid connecting layer firmly attached to the cover on one side and to the underlying insulating coating on the other side. The mat may beforehand be supplied or impregnated with thermoplastic material, for instance in powder form or dissolved in a dissolving medium. The said concentrated pressure can be brought about by permitting the insulating coatings to project somewhat above the surface of the active material, however not above the main portion of the surface of the insulating mat, and/or by providing the said pressure plates with projecting edgings or the like being positioned right before the main bars and the frame portions of the plate. These edgings however must not absorb the whole pressure, since it is essential that the insulating mat is compressed to some extent at the welding so that a certain pressure is maintained between the mat and the active material in the finished plate.

At the manufacture of the electrode shown in Figure 11 the insulating mat in the slots between bars 2a and 2b may simply be removed by means of a tool comprising blades, preferably in the shape of saw blades, which are inserted into the slots.

In the embodiment described above in which the outer cover is a foil embracing the electrode from the sides the coatings on the vertical frame portions may be dispensed with, the cover itself then protecting the underlying parts from the action of the electrolyte. Of course the cover must not be perforated at these places. The horizontal frame parts may be protected against the electrolyte by means of strip or channel-shaped pieces of insulating material which are applied only when the outer cover 6 has been fastened and embrace the edge surfaces and which are welded to the outer side of the cover 6 at the sides of the plate.

In the described embodiments the insulating coatings have been strips or channel-shaped pieces wholly separated from one another. However it is also possible within the scope of the invention to make the insulating coatings in the shape of grid-shaped units, one for each side of the plate, the coatings of the main bars being in the shape of strips, for instance provided with projections in some of the manners previously described, or in the shape of channel-shaped pieces formed according to the main bars, which strips or pieces respectively are kept together by transverse interconnecting parts. The last-mentioned parts may preferably be coatings for the horizontal frame portions.

During the mounting such a unit is applied to each side of the plate, whereafter the different units may be joined in some of the manners described above in connection with the use of coating elements separated from one another. Also in this case the application of the coatings should preferably be performed before the application of the active material.

By making the coatings in this way in large integral units a considerable saving of time is of course gained in the assembly of the plate.

Two such halves may possibly be made as a single unit which is folded about one edge of the plate at the assembly, whereby a still greater saving of time can be obtained. This unit may for instance be folded about the bottom edge of the plate, whereby the latter becomes insulated and protected against the electrolyte. At the top the two halves may be joined by an overlapping joint so as to protect also the top edge, an aperture for the contact lug being provided in the edges of the two halves. The outer cover may be applied in some of the manners previously described, for instance so that the plate is wholly embraced around the vertical edges.

Of course it is also possible within the scope of the invention to make the cover 6 in two parts with one part welded or pasted to each side of the plate.

What is claimed is:

1. An electrode for galvanic cells, said electrode comprising a framework having conductive parts embedded in and carrying active material and conductive bars which are at least partly uncovered by said active material and which are connected to said embedded conductive parts, in which the said bars at least on the parts uncovered by active material are provided with a liquid-tight coating of insulating electrolyte-resistant material, and that a liquid permeable foil of insulating and electrolyte-resistant material is attached on either side of the electrode to the insulating coating of the said bars, and that a layer of porous or fibrous insulating and electrolyte-resistant material is inserted on either side of the electrode between the active material and the said foil, the said bars dividing the electrode into a plurality of sections or partitions and are attached to the said foil on either side of the electrode so that a plurality of rigid pockets for the active material is formed.

2. An electrode according to claim 1, in which the said bars extend vertically when the electrode is in mounted position.

3. An electrode according to claim 1, in which the said liquid-tight coating of insulating electrolyte-resistant material has such an extension on either side of the said bars that boundary lines of the said coating which are located adjacent to the active material are underneath the surface of the active material.

4. An electrode according to claim 3, in which the said coating for each of the said bars is formed by two halves positioned on either side of the corresponding bar and provided with portions joining the two halves.

5. An electrode according to claim 4, in which the said portions pass through apertures in the framework of the electrode the remaining parts of the apertures being filled with active material.

6. An electrode according to claim 1, in which the said bars are formed with recesses filled by the said coating and serving to fix the coating.

7. An electrode according to claim 1, in which the said bars are arranged in directions forming angles with one another.

8. An electrode according to claim 1, in which the said foil on either side of the electrode shows great flexibility and resistance to plastic deformation by tensile stresses at the operating temperature of the electrode.

9. An electrode according to claim 1, in which the said foil on either side of the electrode shows considerable stiffness and is corrugated.

10. An electrode according to claim 9, in which the said corrugations extend vertically when the electrode is in mounted position.

11. An electrode according to claim 9, in which the ridges formed by the corrugations of the said foil and facing the framework of the electrode abut against the said layer of porous or fibrous insulating electrolyte-resistant material, while the furrows formed by the corrugations of the said foil and facing the framework of the electrode contain substantially only electrolyte.

12. An electrode according to claim 9, in which the furrows formed by the corrugations of the said foil and facing the framework of the electrode contain active material.

13. An electrode according to claim 9, in which the furrows formed by the corrugations of the said foil and facing the framework of the electrode are filled with porous or fibrous insulating electrolyte-resistant material.

14. An electrode according to claim 13, in which each of the said corrugations bridge the space between two of the said bars.

15. An electrode according to claim 1, in which the said insulating coatings consist of thermoplastic material.

16. An electrode according to claim 1, in which the said foil consists of thermoplastic material.

17. The method of making an electrode of the class described, said electrode comprising a framework including bars of electrically conductive material; wherein said bars are at least partly coated with a liquid-tight insulating electrolyte-resistant material, the framework of the electrode is filled with active material or material which is to be made active in a subsequent forming process, the filled-in material is covered with porous or fibrous insulating electrolyte-resistant material, and being a foil permeable by liquids and made of electrolyte-resistant material is applied over the said porous or fibrous insulating electrolyte-resistant material and fixed to the coating of liquid-tight insulating electrolyte-resistant material on the said bars.

18. A method according to claim 17 in which the said insulating coatings as well as the said foil are of thermoplastic material, and the electrode after the application of the said foil is made subject to a combined pressure and heat treatment so that the said foil is welded to the said insulating coatings.

19. A method according to claim 18, in which the said foil is given a length sufficient to enable the foil to cover both sides of the electrode, the foil is folded and the folded foil is pushed over the electrode from the side, the electrode then being placed between two hot pressure plates or the like.

20. A method according to claim 17, in which the said insulating coatings are strips or channel-shaped pieces of thermoplastic material arranged on either side of the said bars and frame portions respectively, the said strips or pieces when being mounted are applied to each one side of the said bars and frame portions respectively, and are made adhere to each other by a heat treatment.

21. A method according to claim 17 in which the said insulating coatings are strips or channel-shaped pieces arranged on either side of the said bars and frame portions respectively, the said strips or pieces for each side of the electrode are made by moulding, stamping or the like in such a manner that the separate strips or channel-shaped pieces are held by connecting parts in a predetermined relative position corresponding to the position of the said bars and frame portions respectively.

22. A method according to claim 21, in which said connecting parts are utilized as a coating for the horizontal frame portions of the electrode.

23. A method according to claim 21 in which the said strips or channel-shaped pieces for the two sides of the electrode are made as parts comprised in a continuous grid-shaped unit which, when mounted, is folded about one edge of the electrode.

GUSTAF ERIK BRANDT.

REFERENCES CITED

The following references are of record in the file of this patent:

UNITED STATES PATENTS

| Number | Name | Date |
|---|---|---|
| 583,810 | May et al. | June 1, 1897 |
| 646,992 | Sperry | Apr. 3, 1900 |
| 696,209 | Sperry | Mar. 25, 1902 |
| 1,076,027 | Davis | Oct. 21, 1913 |
| 2,247,992 | Martis et al. | July 1, 1941 |

FOREIGN PATENTS

| Number | Country | Date |
|---|---|---|
| 398,841 | Great Britain | Sept. 19, 1933 |